Figure 1:
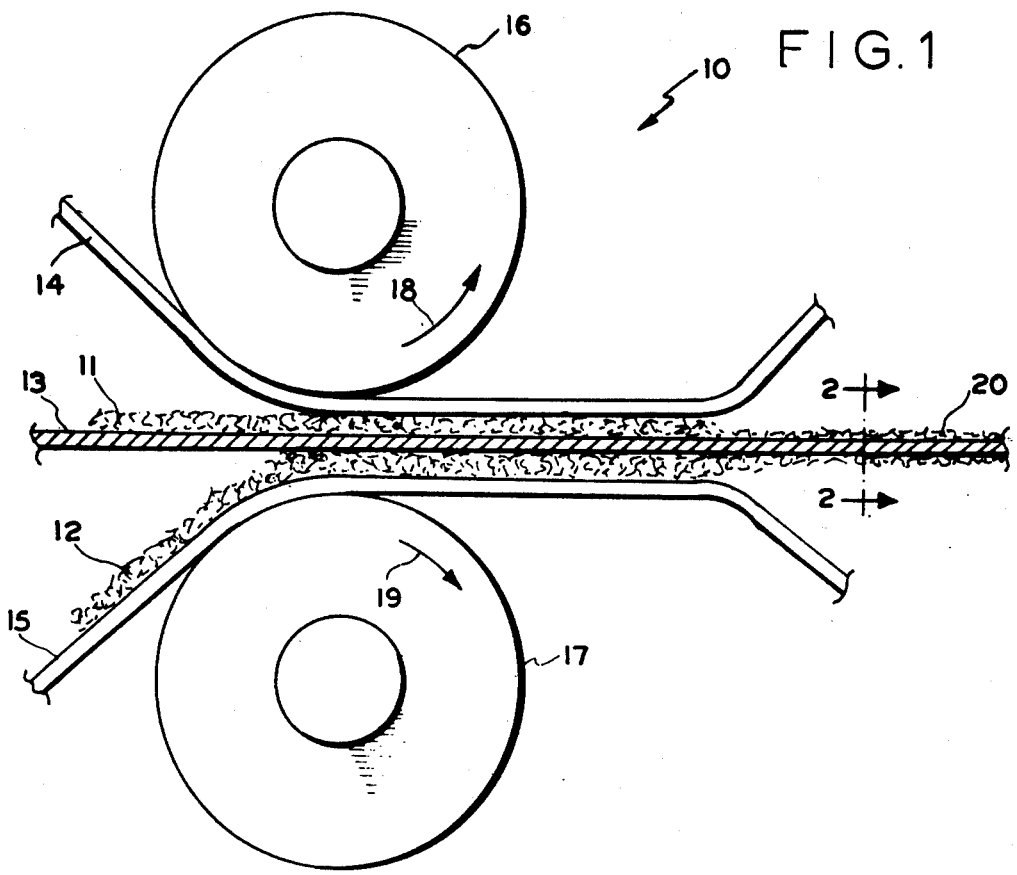

United States Patent [19]

della Porta et al.

[11] 3,975,304

[45] *Aug. 17, 1976

[54] COATING A SUBSTRATE WITH SOFT PARTICLES

[75] Inventors: Paolo della Porta; Angelo Cantaluppi; Bruno Ferrario; Paolo Montalenti, all of Milan, Italy

[73] Assignee: S.A.E.S. Getters S.p.A., Milan, Italy

[ * ] Notice: The portion of the term of this patent subsequent to Dec. 24, 1991, has been disclaimed.

[22] Filed: Dec. 11, 1974

[21] Appl. No.: 531,478

Related U.S. Application Data

[63] Continuation-in-part of Ser. No. 249,772, May 3, 1972, Pat. No. 3,856,709.

[52] U.S. Cl. ............................ 252/463; 252/477 R; 427/180; 427/328; 428/143; 428/148
[51] Int. Cl.² ...................... B01J 21/04; B01J 35/02
[58] Field of Search ....................... 252/463, 477 R; 427/180, 328, 143, 148

[56] References Cited
UNITED STATES PATENTS

| | | | |
|---|---|---|---|
| 3,652,317 | 3/1972 | della Porta et al. | 252/477 R |
| 3,746,658 | 7/1973 | della Porta et al. | 252/477 R |

*Primary Examiner*—W. J. Shine
*Attorney, Agent, or Firm*—Littlepage, Quaintance, Murphy & Dobyns

[57] ABSTRACT

A method of producing a substrate having a particulate coating of high surface area to mass ratio, said method comprising in sequence the steps of:

I. disposing between a substrate and an intermediate body a mixture comprising:
 A. hard substrate-embedding particles which are harder than the substrate and are harder than the intermediate body, and
 B. attachment-resistant particles having at least one property selected from the group consisting of:
  1. a hardness less than that of the substrate and
  2. a size such that they pass through a screen of 270 mesh per inch, II. compressing the substrate and intermediate body, with particles therebetween whereby the intermediate body pushes the hard substrate-embedding particles into the substrate, and III. removing the intermediate body from the particles leaving the hard substrate-embedding particles embedded in the substrate and the attachment-resistant particles adhering to the substrate.

The coated substrates produced by the process of the present invention find utility as catalytic devices to accelerate or retard chemical reactions, getter devices and capacitors.

18 Claims, 2 Drawing Figures

U.S. Patent  Aug. 17, 1976  3,975,304

COATING A SUBSTRATE WITH SOFT PARTICLES

CROSS REFERENCE TO RELATED APPLICATIONS

This application is a continuation-in-part of parent application Ser. No. 249,772, filed May 3, 1972 now U.S. Pat. No. 3,856,709.

Processes have been described for producing substrates having hard metallic particles embedded therein. See U.S. Pat. No. 3,746,658 and Italian Pat. No. 746,551 issued Feb. 1, 1967. However, heretofore it has been thought that such processes were limited to those wherein the particles were harder than the substrate and were embedded into the substrate. Although there are many advantages to such processes such as (1) the absence of a binder, (2) the ability to practice the process at ambient temperatures, (3) the use of rolls while avoiding wear of the rolls and (4) the production of a structure having higher surface area to mass ration, these processes require that the particles be harder than the substrate. See U.S. Pat. No. 3,652,317.

It is therefore an object of the present invention to provide a method for producing a substrate having thereon a coating of particles which are softer than the substrate.

Another object is to provide an improved method which does not require the use of a binder; can be practiced at ambient temperatures; and employs rolls which are not subject to wear.

Yet another object is to provide an improved method for producing a coated substrate such as those suitable to be used as catalytic devices, getter devices, or capacitors. A further object is to provide a method for producing a substrate having attachment-resistant particles adhered thereon, wherein the attachment-resistant particles having at least one property selected from the group consisting of: (1) a hardness less than that of the substrate and (2) a size such that they pass through a U.S. standard screen of 270 mesh per inch.

Figure 2:
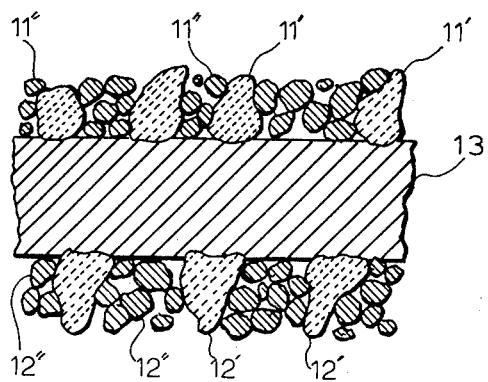

Additional objects and advantages of the present invention will be apparent to those skilled in the art by reference to the following detailed description thereof and drawings wherein:

FIG. 1 is a schematic representation of an apparatus suitable for practicing the method of the present invention; and FIG. 2 is a cross-sectional view with an enlargement of approximately 300 diameters of the structure produced by the process of the present invention. FIG. 2 is taken along Line 2—2 of FIG. 1.

In accordance with the present invention there is provided a method of producing a substrate having a particulate metallic coating of high surface area to mass ratio and usually greater than 2 cm²/mg. The method comprises in sequence the steps of:

I. disposing between a substrate and an intermediate body a mixture comprising:
  A. hard substrate-embedding particles which are harder than the substrate and are harder than the intermediate body, and
  B. soft particles which are softer than the hard substrate-embedding particles and are softer than the substrate, II. compressing the substrate and intermediate body, with particles therebetween whereby the intermediate body pushes the hard substrate-embedding particles into the substrate; and III. removing the intermediate body from the particles leaving the hard substrate-embedding particles embedded in the substrate and the soft particles adhered to the substrate.

In a preferred embodiment of the present invention the substrate is softer than the intermediate body.

In the above method the soft particles can be replaced by any other attachment-resistant particles having at least one property selected from the group consisting of: (1) a hardness less than that of the substrate, and (2) a size such that they pass through a screen of 270 mesh per inch.

Referring now to the drawings and in particular to FIG. 1, there is shown an apparatus 10 suitable for practicing the process of the present invention. In the practice of this process mixtures 11 and 12 of hard substrate-embedding and soft particles are disposed respectively between a substrate 13 and an upper intermediate body 14 and the substrate 13 and a lower intermediate body 15. Most conveniently the particle mixture 11 is placed on the substrate 13 whereas the particle mixture 12 is placed on the lower intermediate body 15 to form a composite structure which is passed between the nip of two rolls 16 and 17 rotating respectively in the direction of arrows 18 and 19. The apparatus 10 is provided with means for maintaining the distance between the rolls less than the combined thickness of the substrate 13, particles 11 and 12, and intermediate bodies 14 and 15. In the preferred embodiment wherein the intermediate bodies 14 and 15 are work-hardenable, the rolls 16 and 17 press the intermediate bodies 14 and 15 with a force such that the intermediate bodies 14 and 15 undergo plastic deformation with concurrent work-hardening while effectively pressing the hard substrate-embedding particles in the mixtures 11 and 12 into the substrate 13 without substantially reducing the total surface area of the soft particles in the mixtures 11 and 12.

The entire composite structure then leaves the nip between rolls 16 and 17 with the intermediate bodies 14 and 15 adhering to the particle mxitures 11 and 12 which are attached to the substrate 13. The intermediate bodies 14 and 15 are then removed leaving behind the coated substrate 20. By virtue of the herein described relationship in hardness between the particles in the mixtures 11 and 12, the substrate 13 and the intermediate bodies 14 and 15, both the hard substrate-embedding and the soft particles in the mixtures 11 and 12 adhere substantially completely to the substrate 13 rather than to the intermediate bodies 14 and 15. This relationship in hardness is critical to the successful practice of the method of the present invention. For example, if the intermediate bodies 14 and 15 are of the same hardness as the substrate 13, the hard substrate-embedding particles in the mixtures 11 and 12 will be randomly embedded in the substrate 13 and the intermediate bodies 14 and 15. On the other hand, if the substrate 13 is harder than the intermediate bodies 14 and 15 the hard substrate-embedding particles will preferentially embed themselves into the intermediate bodies 14 and 15.

Referring now to FIG. 2 there is shown a substrate 13 having large hard substrate-embedding particles 11″ embedded therein. It can be seen that the composite structure is highly porous with the result that the total surface area of the soft particles 11″ are generally only slightly reduced from that originally present in their loose form. This structure is characteristic of products produced by the process of the present invention employing an intermediate body. The underside of the substrate-embedding particles 12' and soft particles 12''. In one embodiment of the present invention, the hard substrate-embedding particles 11', 12' are alumina, whereas the soft particles 11'', 12'' are silver.

The hard substrate-embedding particles can be of widely varying particle sizes but are generally those which pass through a U.S. standard screen of 10 mesh per inch and are preferably those which pass through a U.S. standard screen of 100 mesh per inch and are retained on a screen of 500 mesh per inch. The soft particles must pass through a screen of 50 mesh per inch, preferably pass through a screen of 100 mesh per inch and ideally pass through a screen of 200 mesh per inch. However, the soft particles are generally smaller than the hard substrate-embedding particles. There is virtually no minimum size for the soft particles. In fact, the smaller the particles the greater their surface area. This is especially advantageous when the resultant structure is intended to be a catalyst. However, the size of the soft particles is generally ½ to 1/10,000 and preferably 1/10 to 1/5,000 that of the hard substrate-embedding particles. During the compressing step this permits the hard substrate-embedding particles to maintain separation between the intermediate body and the substrate such that they do not unduly squash the soft particles with a consequent undesirable reduction in their surface area.

Broad and preferred ranges of Vickers hardness for the intermediate body, the particles and the substrate are given in the following table:

| Component | Vickers Hardness Broad Range | Preferred Range |
| --- | --- | --- |
|  | (kg/mm²) | (kg/mm²) |
| Intermediate body | 10–600 | 10–300 |
| Hard substrate embedding particles | 100–∞ | 200–2000 |
| Soft particles | 0.1–200 | 1–100 |
| Substrate | 1–400 | 10–200 |

The values given in this table are non-limiting in the sense that specific values within the above ranges must be chosen while maintaining the herein-described hardness relationship. In a preferred embodiment of the present invention the intermediate body has a Vickers hardness of at least 50 and preferably at least 100 kg/mm² less than that of the hard substrate-embedding particles and the substrate has a Vickers hardness of at least 40 and preferably at least 80 kg/mm² less than that of the intermediate body. The soft particles are generally no harder than the substrate and are usually softer than the substrate.

The soft particles can be those of any metal, or material. In that preferred embodiment wherein the resultant structures are catalytic structures the soft particles are those of a catalytic metal. Of course, the catalytic metal is chosen with respect to the chemical reaction to be catalyzed depending upon chemical process considerations forming no part of this invention. However representative examples of suitable catalytic metals include among others, silver, gold, platinum, copper, mixtures thereof and alloys thereof with one another and with other metals.

In the broadest aspects of the present invention, the hard substrate-embedding particles can either be metals or non-metals, however, non-metals are preferred. When the resultant structure is a catalytic device, the hard substrate-embedding particles must not inhibit the chemical reaction. Examples of suitable metals include among others zirconium, vanadium, tantalum, and titanium. Examples of suitable non-metals include among others silicon carbide, silicon nitride, boron nitride and silica. Alumina and alloys of zirconium and aluminum such as St 101 which contains 84% of zirconium and 16% aluminum are preferred, the refractory metal oxides represent a preferred subgenus of hard substrate-embedding particles.

The weight ratio of hard substrate-embedding particles to soft particles can vary widely as long as the advantages of the present invention are realized. However this ratio is generally between 1:20 and 4:1 and preferably between 1:10 and 1:1. At appreciably lower ratios there are insufficient hard substrate-embedding particles present to maintain separation of the substrate and the intermediate body. This results in undesirable flattening or squashing of the soft particles with a concurrent undesirable reduction in their total surface area. A further undesirable effect of low ratios is decreased adhesion of the soft particles to the substrate. At appreciably higher ratios the total surface area of the soft particles becomes low simply because few of them are present.

The substrate and the intermediate bodies can be of any metal which has the herein described hardness relationship. Examples of suitable metals include among others, soft iron, steel, aluminum, and stainless steel. It must be emphasized that the chemical nature of the elements making up the alloys employed as substrates and intermediate bodies is not critical. In fact, it is conceivable that alloys of identical chemical composition can be employed as both provided that they have differing hardness. However the substrate must not inhibit the catalytic reaction. As is apparent to those skilled in the art, differing hardness can be imparted by conventional metallurgical techniques such as heat treatment, cold rolling and the like.

The invention is further illustrated by the following examples in which all parts and percentages are by weight unless otherwise indicated. These non-limiting examples are illustrative of certain embodiments designed to teach those skilled in the art how to practice the invention and to present the best mode contemplated for carrying out the invention.

EXAMPLE 1

This example illustrates the method of the present invention wherein the resulting structure is a catalytic device.

Referring to FIG. 1, a mixture of finely divided particles of alumina and silver in a weight ratio of 3:7 are placed on each side of an aluminum substrate 0.010 inches thick. The alumina passes through a screen of 100 mesh per inch and is retained on a screen of 270 mesh per inch. The silver passes through a screen of 500 mesh per inch. The substrate has a Vickers hardness of 50 kg/mm². Two intermediate bodies of iron having a Vickers hardness of 300 kg/mm² and a thickness of 0.010 inches are placed on each side of the particles and the resultant composite structure is passed between the nip of two rotating rolls. The intermediate body is then removed leaving the hard substrate-embedding particles embedded in the substrate and the soft particles adhered to the substrate.

EXAMPLE 2

This example illustrates the use of the catalytic devices of the present invention. The resultant catalytic device of Example 1 functions satisfactorily to increase the reaction rate of the reaction of ethylene with oxygen to produce ethylene oxide.

In the parent application means for attaching a certain type of attachment-resistant particles was described and claimed. In the parent application these attachment-resistant particles were referred to as soft particles. It has now been discovered that any attachment-resistant particles can also be adhered to a substrate in the same manner as soft particles are attached to the substrate. The attachment-resistant particles include both the soft and certain small hard particles which hereinafter are more completely described.

The attachment-resistant particles, which are useful in carrying out the instant invention, may possess at least a property selected from the group consisting of: (1) a hardness less than that of the substrate and (2) a size such that they pass through a U.S. standard screen of 270 mesh per inch, preferably 325 and ideally 400 mesh per inch and even more ideally pass through a screen of 600 mesh per inch. The attachment-resistant particles include both soft particles and small hard particles. The small hard particles are of a size such that they pass through a U.S. standard screen of 270 mesh per inch, preferably 325 and ideally 400 mesh per inch, and even more ideally pass through a screen of 600 mesh per inch and are of any hardness including more than or equal to or less than the hardness of the hards substrate-embedding particles. The hardness of the small hard particles can be more than, equal to or less than that of either the substrate or the intermediate body. The hardness of the attachment-resistant particles can be 0.1 to infinity $kg/mm^2$, preferably 1 to 1000 $kg/mm^2$.

The ratio of the hard substrate--embedding particles to the attachment-resistant particles can vary widely but generally is in the range of 1 : 20 to 4 : 1, preferably 1 : 10 to 1 : 1.

EXAMPLE 3

This example illustrates the method of the present invention wherein the resulting structure is a substrate with particles attached to its surface.

This example is repeated in the same way as Example 1 is carried out except that silver particles are replaced by vanadium particles of a size such that they pass through a screen of 600 mesh per inch.

EXAMPLE 4

This is an illustrative example which is carried out in the same way as Example 1 is carried out except that the silver particles are replaced by a mixture of silver and zirconium particles of a size such that they would pass through a screen of 400 mesh per inch.

Although the invention has been described in considerable detail with reference to certain preferred embodiments thereof, it will be understood the variations and modifications can be effected within the spirit and scope of the invention as described above and as defined in the appended claims. Unless otherwise specified, the screens referred to, while specifying the sizes of the particles, are U.S. standard screens.

What is claimed is:
1. A method of producing a substrate having a particulate coating of high surface area to mass ratio, said method comprising in sequence the steps of:
   I. disposing between a substrate and an intermediate body a mixture comprising:
      A. hard substrate-embedding particles which are harder than the substrate and are harder than the intermediate body, and
      B. soft particles which are softer than the hard substrate-embedding particles and are softer than the substrate;
   II. compressing the substrate and intermediate body with particles therebetween whereby the intermediate body pushes the hard substrate-embedding particles into the substrate; and
   III. removing the intermediate body from the particles leaving the hard substrate-embedding particles embedded in the substrate and the soft particles adhering to the substrate,
wherein the hard substrate-embedding particles are of a size such that they are retained on a screen of 500 mesh per inch.

2. The process of claim 1 wherein the particles are placed on the substrate, and wherein an additional amount of particles are placed platinum, a second intermediate body which is on the side of the substrate opposite the first intermediate body in order to produce a structure having particles attached to both sides of the substrate.

3. The process of claim 1 wherein the hard substrate-embedding particles are of a size such that they pass through a screen of 10 mesh per inch.

4. The process of claim 1 wherein the substrate has a Vickers hardness of 10 to 200 $kg/mm^2$.

5. The process of claim 1 wherein the intermediate body has a Vickers hardness of 100 to 300 $2g/mm^2$.

6. The process of claim 1 wherein the hard substrate-embedding particles have a Vickers hardness of 200 to 2000 $kg/mm^2$.

7. The process of claim 1 wherein the intermediate body has a Vickers hardness at least 50 $kg/mm^2$ less than that of the hard substrate-embedding particles.

8. The process of claim 1 wherein the substrate has a Vickers hardness at least 40 $kg/mm^2$ less than that of the intermediate body.

9. The process of claim 1 wherein the size of the soft particles is ½ to 1/10,000 that of the hard substrate-embedding particles.

10. The process of claim 1 wherein the hard substrate-embedding particles are those of a non-metal and the soft particles are those of a catalytic metal selected from the group consisting of silver, gold, platinum, copper, mixture thereof and alloys thereof with one another and with other metals.

11. The process of claim 1 wherein the weight ratio of hard substrate-embedding particles to soft particles is 1:20 to 4:1.

12. The process of claim 1 wherein the hard substrate-embedding particles are refractory metal oxides.

13. A method of producing a catalytic device having particles of a catalyst metal attached to a substrate without the use of a binder, said method comprising in sequence the steps of:
   I. disposing between a substrate and an intermediate body a mixture comprising:

A. hard substrate-embedding particles which are harder than the substrate and are harder than the intermediate body, and
B. catalytic soft particles which are softer than the hard particles;
II. compressing the substrate and intermediate body with particles therebetween, whereby the intermediate body pushes the hard substrate-embedding particles into the substrate and causes the soft particles to adhere to the substrate; and
III. removing the intermediate body from the particles leaving the hard substrate-embedding and soft particles attached to the substrate.

14. A method of producing a substrate having a particulate coating of high surface area to mass ratio, said method comprising the steps of:
I. disposing between the substrate and an intermediate body a mixture comprising:
A. hard substrate-embedding particles which are harder than the substrate and are harder than the intermediate body, said hard substrate-embedding particles being selected from the group consisting of zirconium, vanadium, tantalum, titanium, silicon carbide, silicon nitride, boron nitride, silica, and alumina, and
B. soft particles which are softer than the hard substrate-embedding particles, said soft particles being selected from the group consisting of silver, gold, platium, copper, mixtures thereof and alloys thereof with one another and with other metals.
II. passing the substrate and intermediate body, with particles therebetween, between the nip of two rotating rolls wherein the distance between the rolls is less than the thickness of the substrate and intermediate body with particles therebetween, whereby the intermediate body pushes the hard substrate-embedding particles into the substrate without substantially reducing the surface area of the soft particles, and
III. removing the intermediate body from the particles leaving the hard substrate-embedding particles embedded in the substrate wherein the substrate is made of a material selected from the group consisting of soft iron, steel, aluminum and stainless steel.

15. A method of producing a substrate, having a particulate coating of high surface area to mass ratio, comprising the steps of:
I. disposing between a substrate and intermediate body a mixture comprising:
A. hard substrate-embedding particles which are harder than both the substrate and the intermediate body and of a size such that they are retained on a screen of 500 mesh per inch and
B. attachment-resistant particles having at least one property selected from the group consisting of: (1) a hardness less than that of the substrate and (b) a size such that they pass through a screen of 270 mesh per inch.
II. compressing the substrate and intermediate body with particles therebetween whereby the intermediate body embeds the hard substrate-embedding particles into the substrate thereby adhering the attachment-resistant particles onto the substrate, and
III. removing the intermediate body from the particles leaving the hard substrate-embedding particles embedded into the substrate, and the attachment-resistant particles adhered to the substrate.

16. The method of claim 15 wherein the substrate is softer than the intermediate body.

17. A method of producing a substrate, having a particulate coating of high surface area to mass ratio, as claimed in claim 15, comprising the steps of:
I. disposing between a substrate and an intermediate body a mixture comprising:
A. hard substrate embedding particles which are harder than the substrate and which are of a size such that they pass through a screen of 10 mesh per inch but are retained on a screen of 500 mesh per inch and
B. soft particles which are softer than the substrate and are of a size such that they are 0.5 to $10^{-4}$ times the size of the hard substrate-embedding particles,
II. compressing the substrate and intermediate body whereby the hard substrate-embedding particles are pushed into the substrate and
III. removing the intermediate body thereby leaving the hard substrate-embedding particles embedded in the substrate and the soft particles adhered to the substrate
wherein the intermediate body has a Vickers hardness of at least 50 kg/mm² less than the hard substrate-embedding particles, the substrate has a Vickers hardness of at least 40 kg/mm² less than the intermediate body and the soft particles have a hardness equal to or less than that of the substrate, and
wherein the ratio of hard substrate-embedding particles to the soft particles is in the range of 1:20 and 4:1.

18. A method of producing a substrate, having a particulate coating of high surface area to mass ratio, as recited in claim 15, comprising the steps of:
I. disposing between a substrate and an intermediate body a mixture of particles comprising:
A. hard substrate-embedding particles which are harder than the substrate and are of a size such that they pass through a screen of 100 mesh per inch but are retained on a screen of 500 mesh per inch and
B. attachment-resistant particles which are of a size such that they pass through a screen of 500 mesh per inch,
II. compressing the substrate and the intermediate body whereby the hard substrate-embedding particles are pushed into the substrate,
III. removing the intermediate body from the particles thereby leaving the hard substrate-embedding particles embedded in the substrate and the attachment-resistant particles adhered to the substrate,
wherein the intermediate body has a Vickers hardness of at least 50 kg/mm² less than the hard substrate-embedding particles, the substrate has a Vickers hardness of at least 40 kg/mm² less than the intermediate body and the attachment-resistant particles are of any hardness, and
wherein the ratio of substrate-embedding particles to the attachment-resistant particles is in the range of 1 : 20 to 4 : 1.

* * * * *

UNITED STATES PATENT AND TRADEMARK OFFICE
CERTIFICATE OF CORRECTION

PATENT NO. : 3,975,304
DATED : August 17, 1976
INVENTOR(S) : Paolo della Porta et al.

It is certified that error appears in the above-identified patent and that said Letters Patent are hereby corrected as shown below:

Column 1,
    line 21, delete "ration" and insert --ratio--;
    line 43, delete "6bjects" and insert --objects--.

Column 2, line 65, after "particles" insert --11' and smaller soft particles--.

Column 3, line 5, before "substrate-embedding", insert --substrate 13 similarly contains--.

Column 6, line 27 (Claim 2, line 3), delete "platinum," and insert --on--.

Signed and Sealed this

Twenty-ninth Day of March 1977

[SEAL]

Attest:

RUTH C. MASON
Attesting Officer

C. MARSHALL DANN
Commissioner of Patents and Trademarks